United States Patent
Brohan

(10) Patent No.: US 11,680,668 B2
(45) Date of Patent: Jun. 20, 2023

(54) DEVICE FOR COUPLING TWO PIPES OF A RUN OF PIPING COMPRISING A SET OF FRUSTOCONICAL FLANGES, AND PIPING COMPRISING THE COUPLING DEVICE

(71) Applicant: Airbus Operations SAS, Toulouse (FR)

(72) Inventor: Didier Brohan, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 472 days.

(21) Appl. No.: 16/661,571

(22) Filed: Oct. 23, 2019

(65) Prior Publication Data
US 2020/0132232 A1 Apr. 30, 2020

(30) Foreign Application Priority Data
Oct. 25, 2018 (FR) ...................... 1859844

(51) Int. Cl.
*F16L 27/04* (2006.01)
*F16L 27/06* (2006.01)
*F16L 27/08* (2006.01)

(52) U.S. Cl.
CPC ........... *F16L 27/0812* (2013.01); *F16L 27/04* (2013.01); *F16L 27/06* (2013.01)

(58) Field of Classification Search
CPC ... F16L 27/0812; F16L 27/04; F16L 27/1012; F16L 27/1133; F16L 27/06; F16L 27/073; F16L 21/06; F16L 23/08; F16L 23/18; F16L 23/125; F16L 23/04
USPC .......... 285/272, 261, 276, 138.1, 51
See application file for complete search history.

(56) References Cited

U.S. PATENT DOCUMENTS

| | | | | | |
|---|---|---|---|---|---|
| 2,269,664 | A | * | 1/1942 | Hallerberg | ............. F16L 23/08 |
| 3,498,649 | A | * | 3/1970 | Pfeuffer | ................. F16L 23/04 |
| 3,544,137 | A | * | 12/1970 | Contreras | ............... F16L 27/04 |
| | | | | | 285/261 |
| 4,486,037 | A | * | 12/1984 | Shotbolt | ...................... 285/261 |

(Continued)

FOREIGN PATENT DOCUMENTS

| DE | 2006845 A1 | 8/1971 |
|---|---|---|
| DE | 4121500 A1 | 1/1992 |

(Continued)

OTHER PUBLICATIONS

French Search Report; priority document.

*Primary Examiner* — Zachary T Dragicevich
*Assistant Examiner* — William S. Choi
(74) *Attorney, Agent, or Firm* — Greer, Burns & Crain, Ltd.

(57) ABSTRACT

A coupling device configured to couple first and second pipes, which comprises a first part coupled to the first pipe and which has a first contact surface, a second part coupled to the second pipe, separate from the first part, and which has a second contact surface configured to collaborate with the first contact surface, at least one clamp comprising at least one clamping jaw comprising a groove, configured to collaborate with the first and second parts, which has a cross section such that a concentric tightening of the clamp causes the first and second contact surfaces to be kept pressed against one another. Thus, the coupling device makes it possible to obtain a ball joint type connection between the first and second pipes.

14 Claims, 3 Drawing Sheets

(56) References Cited

U.S. PATENT DOCUMENTS

| | | | | | |
|---|---|---|---|---|---|
| 4,779,901 | A | * | 10/1988 | Halling | F16L 27/04 285/261 |
| 5,415,439 | A | * | 5/1995 | Wells | F16L 27/04 285/261 |
| 5,505,498 | A | | 4/1996 | Halling et al. | |
| 2004/0130149 | A1 | * | 7/2004 | Gilmore | F16L 27/06 285/261 |
| 2006/0082142 | A1 | * | 4/2006 | Berchtold | F16L 27/04 285/261 |
| 2006/0082154 | A1 | * | 4/2006 | Hartig | F16L 23/08 |
| 2017/0254454 | A1 | * | 9/2017 | Vosgeois | F16L 23/08 |
| 2018/0149295 | A1 | * | 5/2018 | Drost | F16L 23/04 |

FOREIGN PATENT DOCUMENTS

| | | | | |
|---|---|---|---|---|
| DE | 20206822 | U1 | 9/2002 | |
| DE | 102004056429 | A1 * | 6/2006 | F16L 27/04 |
| DE | 102004060845 | A1 * | 6/2006 | |

\* cited by examiner

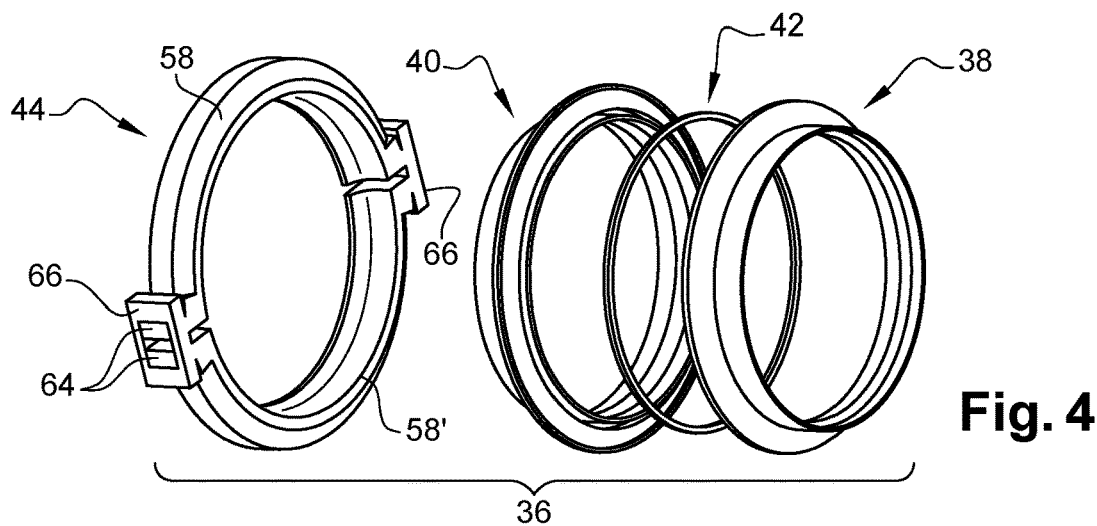
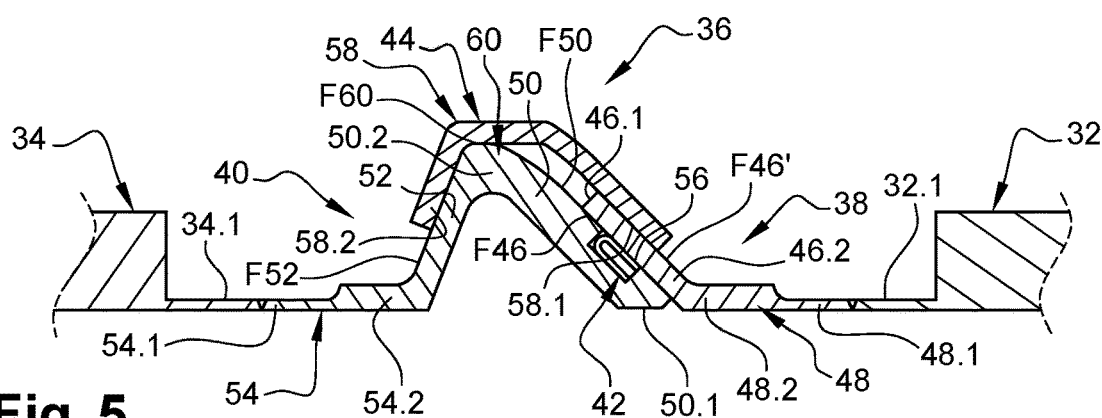
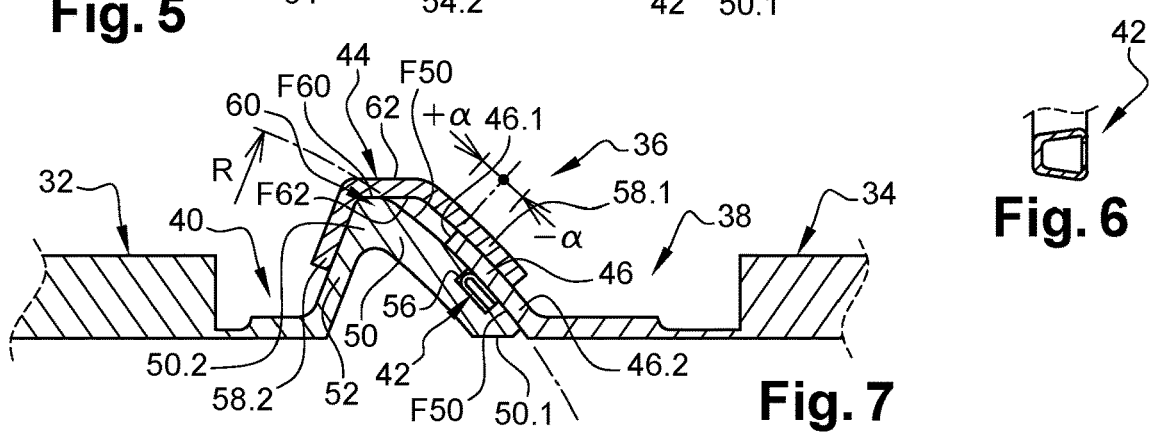
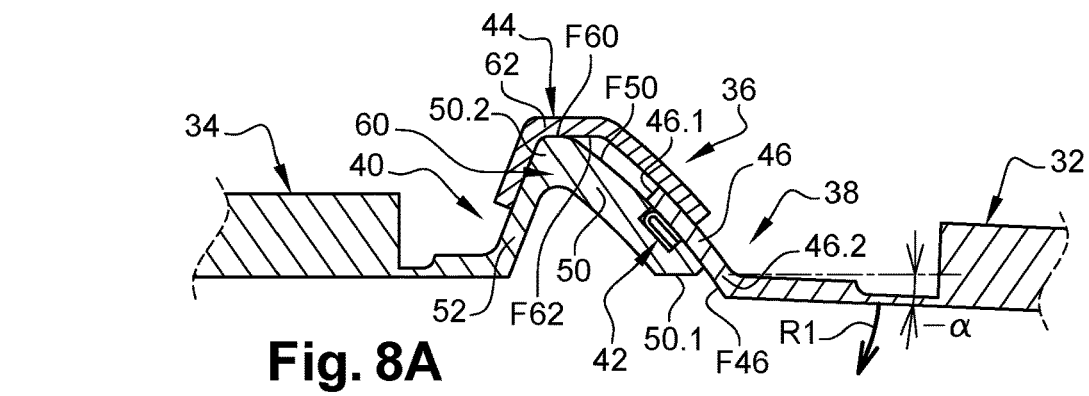

US 11,680,668 B2

DEVICE FOR COUPLING TWO PIPES OF A RUN OF PIPING COMPRISING A SET OF FRUSTOCONICAL FLANGES, AND PIPING COMPRISING THE COUPLING DEVICE

CROSS-REFERENCES TO RELATED APPLICATIONS

This application claims the benefit of the French patent application No. 1859844 filed on Oct. 25, 2018, the entire disclosures of which are incorporated herein by way of reference.

FIELD OF THE INVENTION

The present application relates to a device for coupling two pipes of a run of piping comprising a set of frustoconical flanges and to piping comprising the coupling device.

BACKGROUND OF THE INVENTION

FIGS. 1 and 2 depict a portion of a run of piping 10 intended to carry a fluid, such as a hot gas, for example, which comprises first and second pipes 12.1 and 12.2 having first and second axes of revolution A12.1, A12.2 and a coupling device 14, 14' coupling the first and second pipes 12.1, 12.2. The coupling device 14, 14' is configured to allow the first and second pipes 12.1, 12.2 a translational movement relative to one another in a direction T approximately parallel to the first and second axes of revolution A12.1, A12.2 and/or to pivot relative to one another in rotational movements embodied by the double arrows R.

According to a first embodiment visible in FIG. 1, the coupling device 14 comprises a central section 16 which has bellows and which is extended at each of its ends by first and second cylindrical end sections 18.1, 18.2 respectively coupled to the first and second pipes 12.1, 12.2. According to this first embodiment, the first and second cylindrical end sections 18.1, 18.2 and the central section 16 are produced in a single piece, for example in stainless steel. According to this first embodiment, the central section 16 comprising the bellows reacts to forces between the first and second pipes, and this may prove to be problematical. Because the amplitudes of the rotational R and translational T movements are approximately proportional to the number of bellows, this type of coupling device 14 is relatively weighty in terms of mass.

According to a second embodiment visible in FIG. 2, the coupling device 14' comprises a central section 20 having bellows, first and second cylindrical end sections 22.1, 22.2 at each of the ends of the central section 20 and respectively coupled to the first and second pipes 12.1, 12.2, and a guide system 24 connecting the first and second cylindrical end sections 22.1, 22.2 and positioned concentrically with and on the outside of the central section 20. This guide system 24 allows better control over the relative movements of the first and second pipes 12.1, 12.2 relative to one another compared with the first embodiment and reacts some of the load between the first and second pipes 12.1, 12.2. In this second embodiment, the guide system 24 comprises a first sleeve 26.1 connected to the first cylindrical end section 22.1, a second sleeve 26.2 connected to the second cylindrical end section 22.2 positioned inside the first sleeve 26.1, a ring 28 interposed between the first and second sleeves 26.1, 26.2. The first sleeve 26.1 and the ring 28 have cylindrical contact surfaces so as to allow the first sleeve 26.1 and the ring 28 a translational movement relative to one another in the direction T. To complement that, the second sleeve 26.2 and the ring 28 have spherical contact surfaces to allow the second sleeve 26.2 and the ring 28 to pivot relative to one another in rotational movements R.

Even though the coupling device 14' according to the second embodiment allows better control over the relative movements of the first and second pipes 12.1, 12.2 with respect to one another, the presence of the guide system 24 leads to an increase in the mass of the coupling device 14' compared with the coupling device 14 of the first embodiment.

Document DE2006845 proposes a solution for obtaining a ball joint connection between two pipes. According to this document, a device for coupling two pipes comprises a first part at the end of a first pipe which has a spherical bearing surface, a second part at the end of a second pipe which has a flared shape, configured to collaborate with the spherical bearing surface, and a clamp for keeping the flared shape against the spherical bearing surface. The clamp comprises a tapped hole which is screwed onto a threaded bearing surface of the second part. This solution leads to a significant increase in the weight of the coupling device and is not suitable for pipes with large cross sections.

The present invention seeks to overcome all or some of the disadvantages of the prior art.

SUMMARY OF THE INVENTION

To this end, one subject of the invention is a coupling device intended for coupling first and second pipes of a run of piping, the coupling device comprising a first part, configured to be coupled to the first pipe, as well as a second part configured to be coupled to the second pipe, the first part comprising a first flange which widens in the direction of the second part in operation and which has a first contact surface, the second part comprising a second contact surface, which widens in the same direction as the first contact surface, configured to collaborate with the first contact surface. To complement this, the coupling device comprises at least one seal interposed between the first and second parts and at least one clamp to keep the first and second contact surfaces pressed against one another while allowing them to slip relative to one another.

According to the invention, the clamp comprises at least one clamping jaw comprising a groove, configured to collaborate with the first and second parts, which has a cross section such that a concentric tightening of the clamp causes the first and second contact surfaces to be kept pressed against one another.

The coupling device according to the invention is compact and has a lower mass than the embodiments of the prior art for similar amplitudes of movement.

According to another feature, the first contact surface has a concave spherical shape and the second contact surface has a convex spherical shape, the concave and convex spherical shapes of the first and second contact surfaces having substantially the same radius.

According to another feature, of the first and second contact surfaces at least one comprises a housing configured to house the seal.

According to another feature, the second part comprises second and third flanges which exhibit a joining zone and which form a U-shaped or V-shaped cross section, the second flange comprising the second contact surface.

According to another feature, the housing is positioned on the second contact surface, near a free first end of the second flange.

According to another feature, the first flange has a free end distant from a second end of the second flange in a state of rest.

According to another feature, the free end of the first flange is positioned approximately equidistant from the housing and from the second end of the second flange.

According to another feature, of the first and second contact surfaces, at least one comprises a coating made of a material which encourages the slipping of the first and second contact surfaces against one another.

According to one embodiment, the first flange comprises a coating made of a material that encourages slippage between the first flange and the clamp.

According to another feature, the groove has a first flank configured to be in contact with an external surface of the first flange and a second flank configured to be in contact with an external surface of the third flange.

According to another feature, the first part comprises a first pipe configured to connect the first flange and a first pipe, and the first flank is dimensioned so that, in a state of rest, the first flank is distant from the first cylindrical pipe.

According to another feature, the joining zone joining the second and third flanges has a substantially cylindrical external surface and each clamping jaw comprises a central portion, connecting the first and second flanks, which has a substantially cylindrical internal surface configured to bear against the external surface of the joining zone when the clamp is clamped tight in operation.

According to one configuration, the first flank of the clamping jaw and the external surface of the first flange have collaborating concave and convex spherical shapes.

Another subject of the invention is aircraft piping comprising at least one coupling device according to one of the preceding features.

BRIEF DESCRIPTION OF THE DRAWINGS

Further features and advantages will become apparent from the following description of the invention, which description is given solely by way of example with reference to the attached drawings among which:

FIG. 4 is a perspective view of the various elements of a coupling device in the dismantled state illustrating one embodiment of the invention, FIG. 5 is a half longitudinal section of a coupling device in the assembled state, illustrating one embodiment of the invention, FIG. 6 is a cross section through a seal illustrating one embodiment of the invention, FIG. 7 is a half longitudinal section of a coupling device illustrating one embodiment of the invention in the non-deformed state of rest, FIG. 8A is a half longitudinal section of a coupling device illustrating one embodiment of the invention in the axially misaligned state, pivoted in a first direction.

DETAILED DESCRIPTION OF THE PREFERRED EMBODIMENTS

Figure 1:
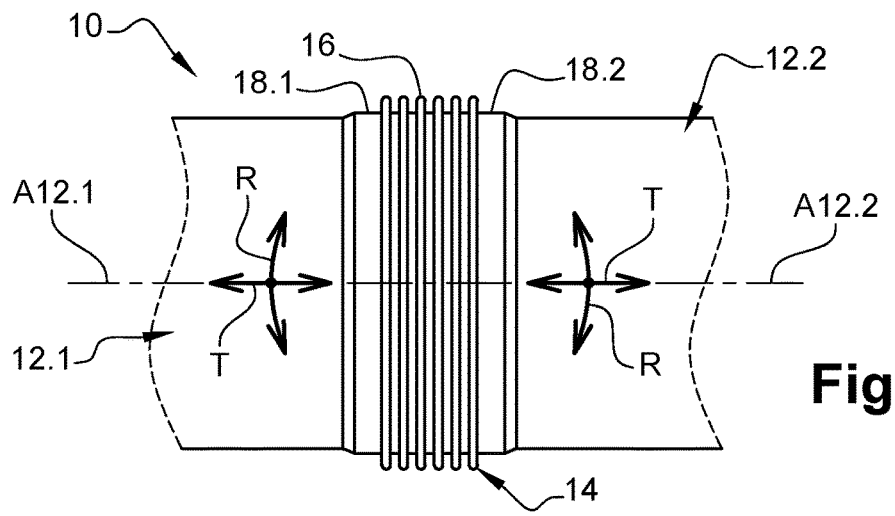
FIG. 1 is a longitudinal section through a coupling device illustrating a first embodiment of the prior art.
Figure 2:
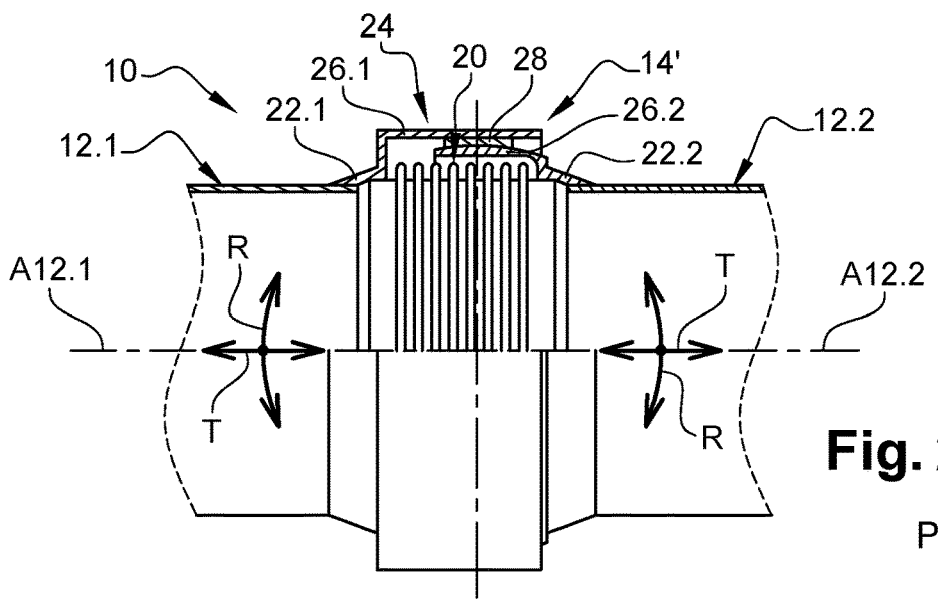
FIG. 2 is a half longitudinal section and half side view of a coupling device illustrating a second embodiment of the prior art.
Figure 3:
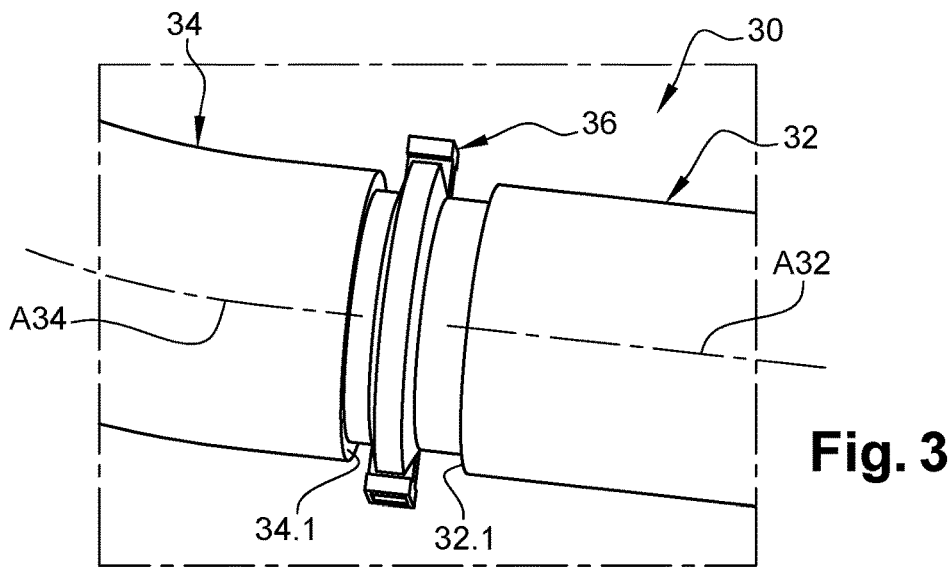
FIG. 3 is a side view of piping equipped with a coupling device illustrating one embodiment of the invention.

FIG. 3 depicts piping 30 comprising a first pipe 32, a second pipe 34 and at least one coupling device 36 coupling the first and second pipes 32, 34.

The first and second pipes 32, 34 have first and second axes of revolution A32, A34, and first and second ends 32.1 and 34.1 connected to the coupling device 36.

According to one application, the piping 30 is configured to carry a hot fluid, such as hot air for example, in an aircraft. According to this application, the first and second pipes are made of metal and covered with insulation. Of course, the invention is not restricted to that application.

For the remainder of the description, a longitudinal direction is parallel to the first axis of revolution A32 of the first pipe 32. A transverse direction is perpendicular to the first axis of revolution A32 of the first pipe 32. A longitudinal plane or a longitudinal surface contains the first axis of revolution A32 of the first pipe 32.

Figure 8B:
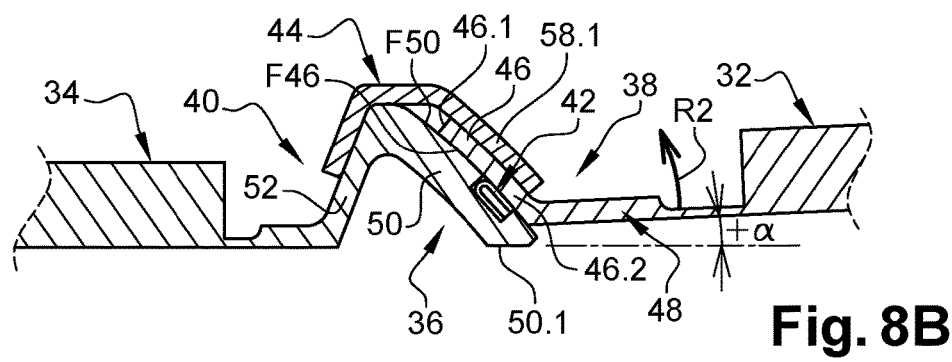
FIG. 8B is a half longitudinal section of a coupling device illustrating one embodiment of the invention in the axially misaligned state, pivoted in a second direction.

The coupling device 36 is configured to ensure continuity between the first and second pipes 32, 34 and to occupy a state of rest, as illustrated in FIGS. 3, 5, 7, in which the axes of revolution A32, A34 of the first and second pipes 32, 34 are substantially aligned, and axially misaligned states, visible in FIGS. 8A and 8B, in which the first and second pipes 32, 34 have moved relative to one another.

Thus, according to a first axially misaligned state visible in FIG. 8A, the first pipe 32 has pivoted with respect to the second pipe 34 about an axis of rotation substantially perpendicular to the second axis of revolution A34, in a first direction R1. According to a second axially misaligned state visible in FIG. 8B, the first pipe 32 has pivoted with respect to the second pipe 34 about an axis of rotation substantially perpendicular to the second axis of revolution A34, in a second direction R2.

Of course, the invention is not restricted to these axially misaligned states, the first and second pipes being able to move relative to one another in rotational movements about any axis passing through a center situated on one of the axes A32, A34 of the first and second pipes 32, 34.

The coupling device 36 comprises a first part 38 connected to the first pipe 32, a second part 40, separate from the first part 38, connected to the second pipe 34, at least one seal 42 interposed between the first and second parts 38, 40 as well as at least one clamp 44 that keeps the first and second parts 38, 40 pressed against one another, the first and second parts 38, 40 being configured to allow the first and second pipes to move from a state of rest into an axially misaligned state and vice versa.

According to one embodiment visible in FIG. 5, the first part 38 comprises a first flange 46, which is approximately frustoconical, which widens in the direction of the second part 40 in operation, as well as a first cylindrical section 48 having a first end 48.1 connected to the first pipe 32 and a second end 48.2 connected to the first flange 46.

The first cylindrical section 48 is connected to the first pipe 32 by any suitable means, such as by welding for example, the first cylindrical section 48 and the first pipe 32 being placed end to end or pushed one inside the other.

According to one embodiment visible in FIG. 5, the second part 40 comprises second and third flanges 50, 52, which are approximately frustoconical, forming a U-shaped or V-shaped cross section widening in the direction of the second axis A34, and a second cylindrical section 54 having a first end 54.1 connected to the second pipe 34 and a second end 54.2 connected to the third flange 52.

The second flange 50 widens in the same direction as the first flange 46 and the third flange 52 widens towards the second flange 50 and connects the second flange 50 and the second cylindrical section 54.

The second cylindrical section 54 is connected to the second pipe 34 by any suitable means, such as by welding for example, the second cylindrical section 54 and the second pipe 34 being placed end to end or pushed one inside the other.

Each of the cylindrical sections 48, 54 and of the first, second and third flanges 46, 50, 52 comprises an internal surface oriented towards the first or second axis of revolution A32 or A34 and an external surface on the opposite side to the internal surface.

In the state of rest, the first flange 46 and the first axis of revolution A32 substantially form the same angle as the second flange 50 and the second axis of revolution A34.

The first flange 46 comprises a first contact surface F46 configured to be pressed firmly against a second contact surface F50 of the second flange 50. The first contact surface F46 corresponds to the internal surface of the first flange 46 and the second contact surface F50 corresponds to the external surface of the second flange 50.

According to one feature, the first contact surface F46 has a concave spherical shape having a center positioned approximately on the first axis of revolution A32. To complement this, the second contact surface F50 has a convex spherical shape having a center positioned approximately on the second axis of revolution A34, the concave and convex spherical shapes of the first and second contact surfaces F46, F50 having substantially the same radius R.

According to another feature, of the first and second contact surfaces F46, F50 at least one comprises a housing 56 configured to house the seal 42. According to one configuration, the housing 56 is provided at the second contact surface F50. According to one embodiment, the seal 42 is an annular seal with a C-shaped cross section, as illustrated in FIG. 6. Of course, the invention is not restricted to this shape of seal.

According to one embodiment, the first and second flanges 46, 50 respectively have first ends referred to as free ends 46.1 and 50.1 and second ends 46.2 and 50.2 respectively connected to the first cylindrical section 48 and to the third flange 52. According to one configuration, the housing 56 for the seal 42 is provided near the free end 50.1 of the second flange 50. In the state of rest, the second end 46.2 of the first flange 46 is positioned approximately at the level of the free first end 50.1 of the second flange 50. The free first end 46.1 of the first flange 46 is distant from the second end 50.2 of the second flange 50. This free first end 46.1 is positioned approximately equidistant from the housing 56 and from the second end 50.2 of the second flange 50, as illustrated in FIG. 7. Thus, the first part 38 of the coupling device 36 can pivot with respect to the second part 40 in the first direction R1 by an angle −α with respect to the state of rest and in a second direction R2 by an angle +α with respect to the state of rest. In all instances, the first flange 46 must always remain in contact with the seal 42 in order to provide satisfactory sealing and cover the housing 56 provided for the seal 42.

Of the first and second contact surfaces F46, F50 at least one comprises a coating made of a material encouraging the slipping of the first and second contact surfaces F46, F50 against one another. According to one embodiment, the first contact surface F46 and/or the second contact surface F50 comprises a polytetrafluoroethylene coating.

According to one embodiment, the external surface of the first flange 46 comprises a coating made of a material encouraging slippage between the first flange 46 and the clamp 44, such as made of polytetrafluoroethylene, for example.

According to another feature, the clamp 44 is configured to keep the first and second contact surfaces F46, F50 pressed against one another over the entire periphery of the first and second parts 38, 40.

The clamp 44 comprises at least one clamping jaw 58 comprising a groove which collaborates with the first and second parts 38, 40 and which has a cross section such that a concentric tightening of the clamp 44 causes the first and second contact surfaces F46, F50 to be kept pressed against one another. Concentric tightening is understood to mean that the clamp has a diameter which decreases during the tightening. This configuration for the clamp makes it possible to be able to keep the first and second contact surfaces F46, F50 pressed against one another even for the large pipe cross sections.

The groove has a first flank 58.1 in contact with the first part 38 in operation and a second flank 58.2 in contact with the second part 40 in operation. According to one configuration, in operation, the first flank 58.1 is in contact with the external surface F46' of the first flange 46 and the second flank 58.2 is in contact with the external surface F52 of the third flange 52.

According to one configuration, the first flank 58.1 of the clamping jaw 58 and the external surface F46' of the first flange 46 have collaborating concave and convex spherical shapes. The second flank 58.2 of the clamping jaw 58 and the external surface F52 of the third flange 52 have collaborating frustoconical shapes.

According to another feature, the second and third flanges 50, 52 comprise a joining zone 60 which has a substantially cylindrical external surface F60 coaxial with the second axis of revolution A34. To complement this, each clamping jaw 58 comprises a central portion 62, connecting the first and second flanks 58.1, 58.2, which has a substantially cylindrical internal surface F62 configured to bear against the external surface F60 of the joining zone 60 when the clamp 44 is clamped tightly so as to allow slippage between the first and second contact surfaces F46, F50 and therefore allow a relative pivoting movement of the first and second parts 38, 40 with respect to each other.

The first flank 58.1 is dimensioned so that, in the state of rest, it is distant from the first cylindrical pipe 48 so as to allow a pivoting movement in the second direction R2, as illustrated in FIG. 8B.

The first flange 46 is dimensioned so that, in the state of rest, its free end 46.1 is distant from the central portion 62 of the clamp 44 so as to allow a pivoting movement in the second direction R2, as illustrated in FIG. 8B.

Figure 9A:
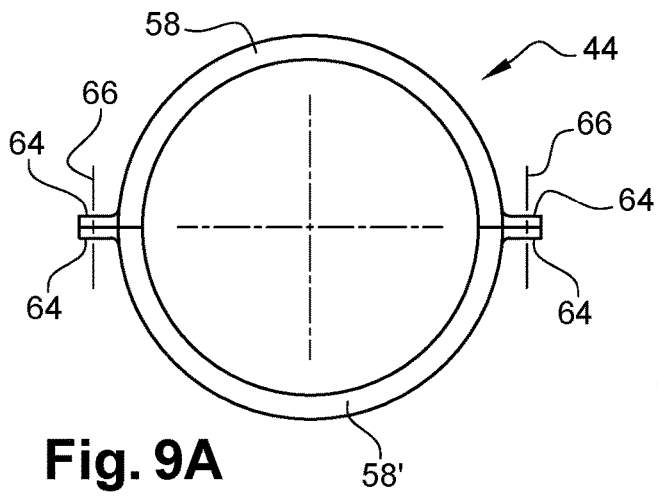
FIG. 9A is a face view of a clamp illustrating a first embodiment of the invention.

According to a first embodiment visible in FIG. 9A, the clamp 44 comprises two clamping jaws 58, 58' in the shape of a semicircle, with lugs 64 at each of their ends, and connecting elements 66 allowing the lugs 64 to be kept pressed against one another so that the two clamping jaws 58, 58' clamp together the first and third frustoconical flanges 46, 52.

Figure 9B:
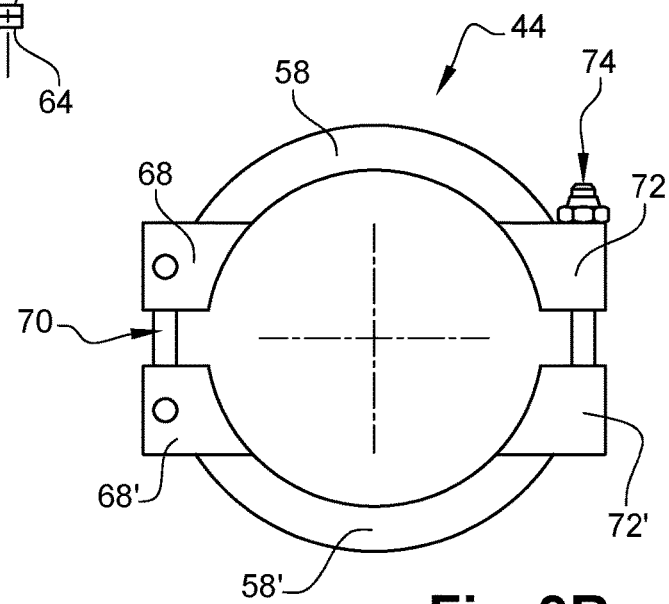
FIG. 9B is a face-on view of a clamp illustrating a second embodiment of the invention.

According to a second embodiment visible in FIG. 9B, the clamp 44 comprises two clamping jaws 58, 58' which have first ends 68 connected by an articulation 70 and second ends 72 connected by a tightening screw 74.

Figure 9C:
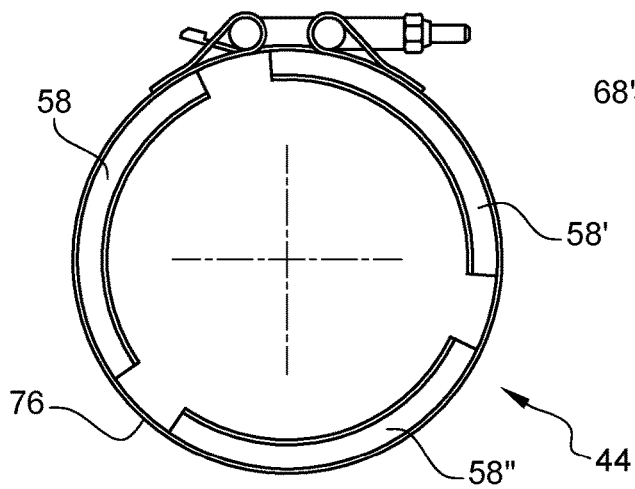
FIG. 9C is a face-on view of a clamp illustrating a third embodiment of the invention.

According to a third embodiment visible in FIG. 9C, the clamp 44 comprises three clamping jaws 58, 58', 58" uniformly distributed around the periphery of the first and second parts 38, 40, and a clamping collar 76 configured so that the three clamping jaws 58, 58', 58" clamp together the first and third frustoconical flanges 46, 52.

Of course, the invention is not restricted to these embodiments for the clamp 44 and the second part 40. Whatever the embodiment, the second part comprises an approximately frustoconical contact surface F50 which widens in the same direction as a contact surface F46 of the first flange 46 of the first part 38, the contact surfaces F46 and F50 having concave and convex spherical shapes. To complement this, the clamp 44, the first and second parts 38, 40 are configured so that, in operation, the contact surfaces F46 and F50 are kept in contact against one another while allowing slippage between the first and second contact surfaces F46, F50. Thus, the coupling device makes it possible to obtain a connection of the ball joint type between the first and second pipes 32, 34.

According to the invention, the slippage between the first and second flanges 46, 50 makes it possible to obtain a relative rotational movement of the first and second pipes 32, 34 relative to one another.

The coupling device according to the invention makes it possible to obtain a device that is compact, with a lower masts than the embodiments of the prior art, which offers relative movements of the first and second pipes relative to one another that are substantially identical to those of the devices of the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A coupling device intended for coupling first and second pipes of a run of piping, the coupling device comprising:
    a first part, configured to be coupled to the first pipe, as well as a second part configured to be coupled to the second pipe,
        the first part comprising a first flange which widens in the direction of the second part in operation and which has a first contact surface,
        the second part comprising a second contact surface, which widens in a same direction as the first contact surface, configured to collaborate with the first contact surface, the second part comprising a second flange and a third flange,
        the coupling device comprising at least one seal interposed between the first and second parts as well as at least one clamp to keep the first and second contact surfaces pressed against one another while allowing them to slip relative to one another,
        at least one of the first contact surface and the second contact surface including a housing configured to house the seal,
    wherein the clamp comprises at least one clamping jaw comprising a groove, configured to contact with external surfaces of both the first and second parts such that the clamp contacts the first flange, the second flange and the third flange, the groove having a cross section such that a concentric tightening of the clamp causes the first and second contact surfaces to be kept pressed against one another,
    wherein the groove has a first flank configured to be in contact with an external surface of the first flange and a second flank configured to be in contact with an external surface of the third flange, and,
    wherein the at least one of the first contact surface and the second contact surface which includes the housing has a reduced thickness at the housing,
    wherein a joining zone joining the second and third flanges has a cylindrical external surface, and
    wherein each clamping jaw comprises a central portion, connecting the first and second flanks, which has a cylindrical internal surface configured to bear against the external surface of the joining zone when the clamp is clamped tight in operation.

2. The coupling device according to claim 1, wherein the first contact surface has a concave spherical shape and wherein the second contact surface has a convex spherical shape, the concave and convex spherical shapes of the first and second contact surfaces having the same radius.

3. The coupling device according to claim 1, wherein the joining zone form a U-shaped or V-shaped cross section, the second flange comprising the second contact surface.

4. The coupling device according to claim 1, wherein the joining zone form a U-shaped or V-shaped cross section, the second flange comprising the second contact surface, and wherein the housing is positioned on the second contact surface, at a distance a free first end of the second flange.

5. The coupling device according to claim 3, wherein the first flange has a free end distant from a second end of the second flange in a state of rest.

6. The coupling device according to claim 5, wherein the free end of the first flange is positioned equidistant from the housing and from the second end of the second flange.

7. The coupling device according to claim 1, wherein, of the first and second contact surfaces, at least one comprises a coating made of a material which encourages a slipping of the first and second contact surfaces against one another.

8. The coupling device according to claim 7, wherein the first flange comprises a coating made of a material that encourages slippage between the first flange and the clamp.

9. The coupling device according to claim 1, wherein the first part comprises a first pipe configured to connect the first flange and the first pipe, and wherein the first flank is dimensioned so that, in a state of rest, the first flank is distant from the first pipe.

10. The coupling device according to claim 1, wherein the first flank of the clamping jaw and the external surface of the first flange have collaborating concave and convex spherical shapes.

11. The coupling device according to claim 1, wherein the seal is an annular seal with a C-shaped cross section.

12. The coupling device according to claim 1, wherein the housing has a rectangular cross-section.

13. An aircraft piping comprising at least one coupling device according to claim 1.

14. A coupling device intended for coupling first and second pipes of a run of piping, the coupling device comprising:
- a first part, configured to be coupled to the first pipe, as well as a second part configured to be coupled to the second pipe,
  - the first part comprising a first flange which widens in the direction of the second part in operation and which has a first contact surface, the first flange comprising a first free end and a second end configured to be coupled to the first pipe,
  - the second part comprising a second contact surface, which widens in a same direction as the first contact surface, configured to collaborate with the first contact surface, the second part comprising a second flange, the second flange comprising the second contact surface, the second flange comprising a free first end and a second end connected to a third flange,
- the coupling device comprising at least one seal interposed between the first and second parts as well as at least one clamp to keep the first and second contact surfaces pressed against one another while allowing them to slip relative to one another,
- one of the first contact surface and the second contact surface including a housing configured to house the seal, the other of the first contact surface and the second contact surface completely covering the housing,
- wherein the clamp comprises at least one clamping jaw comprising a groove, configured to collaborate with the first and second parts, which has a cross section such that a concentric tightening of the clamp causes the first and second contact surfaces to be kept pressed against one another,
- wherein the at least one of the first contact surface and the second contact surface which includes the housing has a reduced thickness at the housing, and
- wherein the housing is positioned on the second contact surface, closer to the free first end of the second flange than to the second end,
- wherein a joining zone joining the second and third flanges has a cylindrical external surface, and
- wherein each clamping jaw comprises a central portion, connecting the first and second flanks, which has a cylindrical internal surface configured to bear against the external surface of the joining zone when the clamp is clamped tight in operation.

\* \* \* \* \*